Dec. 23, 1969   R. J. DURAN ET AL   3,485,017
FOLDING HANDLE FOR LAWN MOWER
Filed March 17, 1967                           2 Sheets-Sheet 2
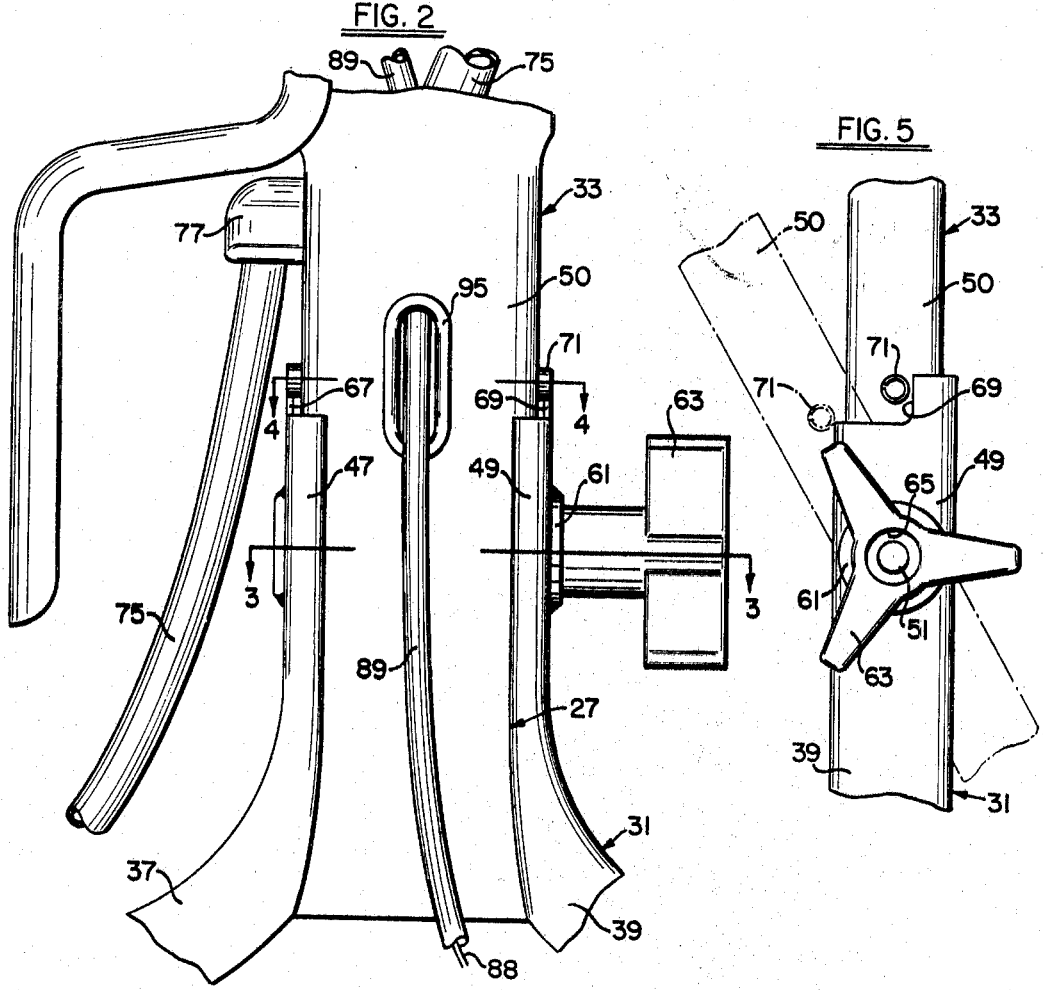
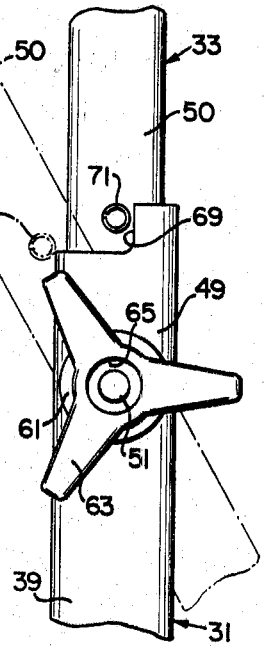
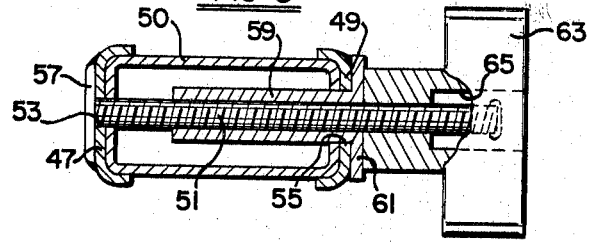
INVENTORS
RAYMOND J. DURAN
ALLEN G. BEARES
BY *Joseph R. Slotnik*
ATTORNEY

# United States Patent Office 3,485,017
Patented Dec. 23, 1969

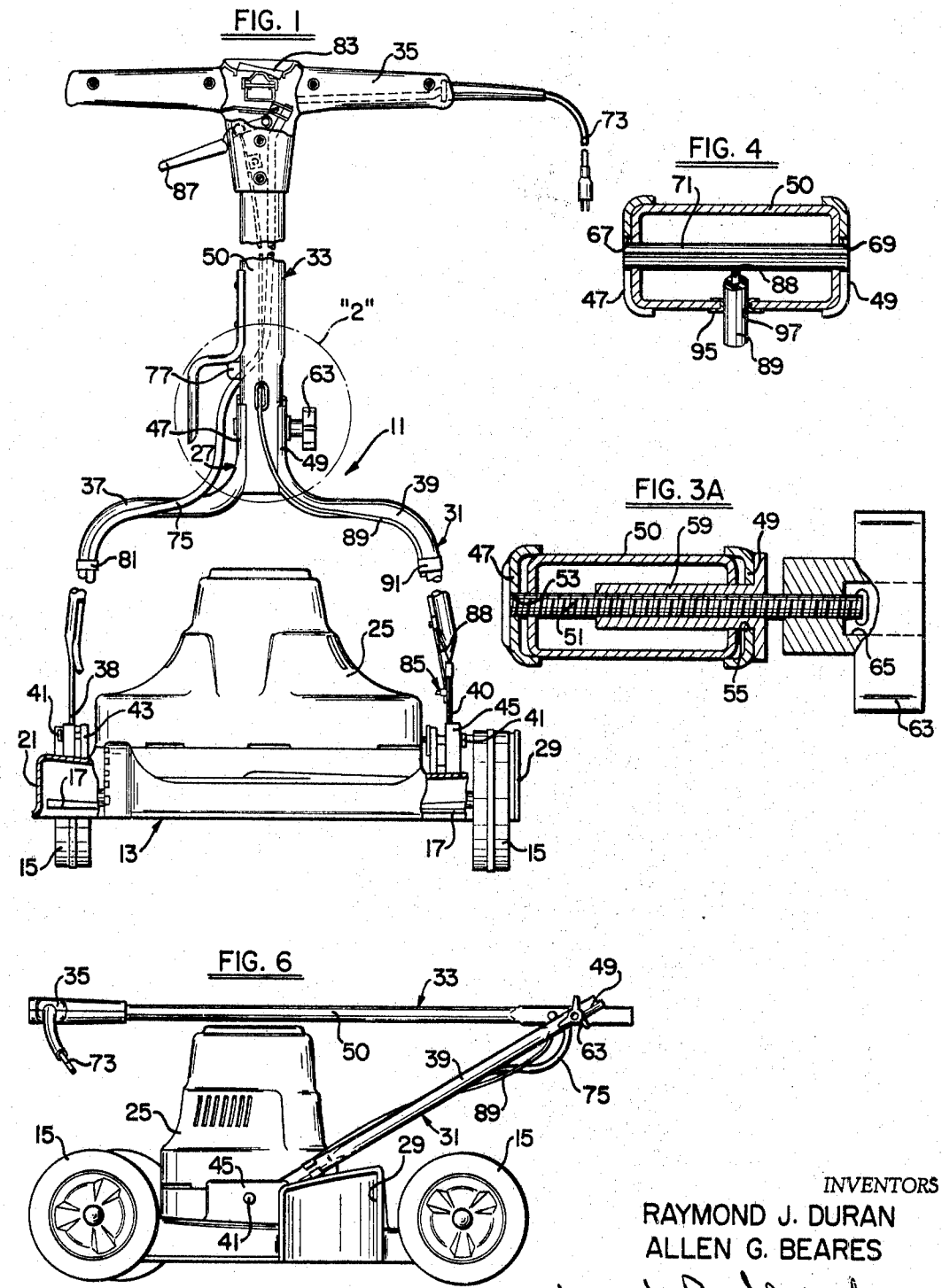

3,485,017
FOLDING HANDLE FOR LAWN MOWER
Raymond J. Duran, Lutherville, and Allen G. Beares, Towson, Md., assignors to The Black and Decker Manufacturing Company, Towson, Md., a corporation of Maryland
Filed Mar. 17, 1967, Ser. No. 623,995
Int. Cl. A01d 75/00
U.S. Cl. 56—25.4                                                                    8 Claims

ABSTRACT OF THE DISCLOSURE

The device hereinafter described relates to a lawn mower of the type which includes a housing having a plurality of wheels fixed thereto to support the housing and facilitate movement thereof over the ground. A motor is mounted atop the housing and drives one or more rotary blades disposed beneath the housing and protected thereby. A handle is mounted on the housing for manipulation and control of the mower and the handle is foldable when the mower is inactive for easy storage and transportation.

BRIEF SUMMARY OF THE INVENTION

This invention relates generally to lawn mowers, and particularly to an improved, folding, handle construction therefor.

The present invention relates to an improved handle construction for lawn mowers and the like, which construction provides a normally rigid and sturdy handle but which, when desired, is foldable to facilitate easy mower storage and/or transportation. In addition, the hanle construction of the present invention is utilitarian in that when employed with an electric powered mower having a reversible, latched handle construction, it is adapted to enshroud part of an operating cable handle latch and/or part of an electric motor cable.

Accordingly, main objects of the present invention are to provide an improved mower handle construction which normally is rigid and sturdy providing for safe mower operating and control, and which is adapted for selective folding when the mower is inactive facilitating easy mower storage and/or transporting.

Additional important objects of the present invention are to provide an improved handle construction of the above character which finds particular utility in an electric powered mower employing a reversible, latched handle, which construction is adapted to enshroud a sector of motor cable for the electric motor and/or an operating cable for a handle latch and which will not damage the latter when folded.

Further objects of the present invention include the provision of a foldable handle construction of the above character which is relatively inexpensive to manufacture, rugged and light weight in construction, neat and aesthetically pleasing in appearance and reliable in use.

Other objects and advantages of the present invention will become more apparent from a consideration of the detailed description and the drawings to follow.

BRIEF DESCRIPTION OF DRAWINGS

FIG. 1 is a fragmentary elevational view, partly in section, and illustrating a mower embodying the present invention;

FIG. 2 is an enlarged view of a portion of FIG. 1 taken within the enclosure "2" thereof;

FIG. 3 is a sectional view of FIG. 2 taken along the line 3—3 thereof and showing the handle parts secured for normal mower operation;

FIG. 3A is a view similar to FIG. 3, but showing the handle parts released ready for folding thereof;

FIG. 4 is a sectional view of FIG. 2 taken along the line 4—4 thereof;

FIG. 5 is a side view of the structure of FIG. 2; and

FIG. 6 is a side view of the structure of FIG. 1 and showing the handle in the folded position.

BROAD STATEMENT OF THE INVENTION

Broadly described, the present invention relates to a mower of the type which includes a housing supported for movement over the ground mowing blade means supported by said housing, and an operating handle secured to said housing; that improvement in said mower wherein said handle comprises a lower handle portion including a pair of arms each having one end secured to said housing, the other ends of said arms each being generally channel shaped in cross-section and disposed in spaced confronting relation, an upper handle portion including an elongated post of hollow, generally rectangular cross-section positionable between said channel shaped arm ends, elongated means adapted to both pivotally interconnect said post and said channel shaped arm ends and draw said channel shaped arm ends toward each other and said post, said other arm ends each being notched to form aligned abutment surfaces, pin means extending through said post and engageable with said abutment surfaces to limit relative pivotal movement between said post and said channel shaped arms and to position said post in longitudinal alignment with said arms.

DETAILED DESCRIPTION

Referring now more specifically to the drawings, a lawn mower embodying the present invention is illustrated generally at 11 in FIG. 1 and is seen to include a housing 13 preferably, but not necessarily, constructed of integral, cast aluminum, and supported by a plurality of ground engaging wheels 15 rotatably carried thereby at suitable locations thereabound. One or more rotary blades 17 are carried by shafts (not shown) rotatably supported upon the housing 13 and the blades adapted to rotate within the confines of a peripheral skirt 21 integral with the housing and are arranged in close disposition to the ground. An electric drive motor (not shown) is mounted atop the housing 13 and drives the blade shafts (not shown) and the motor is covered and protected by a plastic shroud 25 secured to the housing 13. During use, the mower 11 is moved over the ground and is manipulated and controlled by a handle generally illustrated at 27 and embodying the present invention. Grass cuttings are discharged from the mower 11 through a discharge opening 29 formed in one side of the skirt 21.

As will be understood from the description to follow, the handle 27 of the present invention finds particular utility in electric powered mowers. However, it should also be understood that the handle construction 27, as will be described hereinafter, may be employed with other types of mowers including both gas and electric, powered mowers, as well as other types of hand manipulated, over-the-ground lawn and garden devices.

With this in mind, reference is now made to FIGS. 1 and 2 wherein the handle 27 is seen to include a lower portion 31 secured to the housing 13 and an upper portion 33 having handle grips 35 secured thereto. The lower handle portion 31 is seen to include a pair of generally S-shaped arms 37, 39 having their lower terminal ends 38, 40 secured by pins 41 to mounting lug means 43, 45 integral with or otherwise fixed to the housing 13. The upper ends 47, 49 of the arms 37, 39 are disposed generally parallel to each other and each has a generally channel shaped cross-sectional configuration (FIGS. 3 and 4). The upper handle portion 33 includes a hollow, generally rectangular cross-sectional post 50 having its lower end disposed between the channel shaped upper ends 47, 49 of the arms 37, 39.

A holding screw 51 extends through aligned openings 53, 55 in the arm upper ends 47, 49 and the screw has a head 57 welded to the arm end 47 to prevent the screw from turning. Alternatively, the screw 51 may be keyed or otherwise fitted into or secured to the arm end 47 to present turning movement thereof during use. A guide bushing 59 fits snugly into the opening 55, which is somewhat larger than the opening 53, and the bushing receives and supports the screw 51 through out a substantial portion of its length. A radial flange 61 on the bushing 59 overlays the arm upper end 49 and is secured thereto as by welding. The outer end of the screw 51 extends substantially beyond the bushing 59 and has a knob 63 threaded thereon. The outer end of the knob 63 has a counterbore 65 and the outer end of the screw 51 is staked, peened or otherwise deformed after the knob 63 is threaded thereon to prevent knob removal.

In use, the parts are normally positioned as seen in FIGS. 1–4 with the handle post 50 aligned generally with the handle arms 37, 39. The rectangular configuration of the handle post 50 contributes greatly to the strength of the handle 27 and makes it more resistant to twisting. When the knob 63 is tightened down on the screw 51 and presses against the bushing flange 61, the arm upper ends 47, 49 are clamped on and partially envelope the handle post 50 and the handle portions 31, 33 are maintained rigid.

When it is desired to fold the handle 27, such as, for example, for mower storing or transportation purposes, the knob 63 is loosened on the screw 51 to the position shown in FIG. 3A. This releases the holding pressure on the arm upper ends 47, 49 so that they can fall away from the handle post 50 and permit free pivotal movement of the handle post 50, as shown in dot-dash lines in FIG. 5. Alternatively if the arm upper ends 47, 49 do not fall completely away from the post 50 upon loosening the knob 63, the holding pressure of the arm ends on the handle post 50 will have been relaxed sufficiently so that when the post 50 is pivoted, the arm upper ends 47, 49 are wedged apart. In any event, after loosening the knob 63, the handle post 50 can be pivoted downwardly and forwardly to a position resting atop the motor shroud 25 as shown in FIG. 6. When it is desired to reposition the handle post 50 for normal power operation, it is swung upwardly to the position shown in FIGS. 1, 2 and 5 and the knob 63 tightened to clamp the arm upper ends 47, 49 snugly against the post 50.

To assist in locating the upper handle post 50, the arm upper ends 47, 49 are notched to form aligned abutment surfaces 67, 69. The post 50 has a pin 71 pressed therethrough adapted to engage the surfaces 67, 68 to prevent backward pivotal movement of the post 50 past the operative position shown in FIG. 5. When the handle post 50 is pivoted rearwardly and upwardly from the inoperative folded position, cooperation between the pin 71 and the surfaces 67, 69 insure that the handle portions 33, 35 are properly aligned for normal mower operation. However, the slots permit free pivotal movement of the handle post 50 in a forward and downward direction when the handle 27 is to be folded as described.

As pointed out briefly above, the handle 27 of the present invention is adapted for use in an electric powered mower. Thus, a line cord 73 extends through one side of the handle grips 35 and is interconnected with a double insulated motor cable 75, the latter extending through the handle post 50. The motor cable 75 exists the handle post 50 through a bushing 77 at one side of the post 50. The cable 75 extends down along one handle arm 37 and in through the shroud 25 to the motor (not shown). One or more clips 81 hold the motor cable 75 in place on the handle arm 37. A switch 83 is located preferably centrally of the handle grips 35 and is recessed therein as shown in FIG. 1 to prevent accidental trip thereof. The switch 83 interconnects one lead from the line cord 73 with one lead from the motor cable 75 to facilitate easy on-off control of the motor 23.

In electric mowers, it is desirable that the handle therefor can be flipped over or reversed so that in normal back and forth mowing, the line cord 73 can be kept to one side of the mower 11 to avoid cutting the cord and to prevent it from interfering with the operator. The mower 11 illustrated is so constructed that the handle 27 can be reversed. However, in order to prevent accidental or unintended handle flip-over, a handle latch assembly 85 is provided on the handle arm 39 and cooperates with the handle mounting lug means 47 to hold the handle 27 against such accidental flip-over. A hand-manipulated lever 87 is pivoted on the handle grips 37 and is connected to the latch assembly 85 through a cable 88 so that by pulling up on the lever 87, the assembly 85 is released and the handle 27 can be flipped over. The cable 88 is covered and protected by a sheath 89 and has one end extending through the post 50 and within the grips 37 and is fixed to the lever 87. The cable 88 and sheath 89 exit the post 50 through a grommet 95 positioned in a post opening 97 and the lower end of the cable 88 and sheath 89 extends along the handle arm 39, with the sheath 89 being detachably held thereon by one or more clips 91 and the cable 88 being connected to the latch assembly 85. A detailed description of the latch assembly 85 is omitted here since it forms no part of the present invention. However, for a better understanding thereof, reference may be made to the copending application of William R. Lessig III, Ser. No. 629,727 filed Apr. 10, 1967 and owned by the assignee of the present invention.

It will be appreciated that both the motor cable 75 and the latch control cable 88, by being encased within the handle post 50, are partially protected thereby and that this arrangement adds to the overall appearance of the mower. In addition, the control cable 88 exits the post 50 at the side thereof facing the direction in which the post is folded, and both the motor cable 75 and control cable 88 exit the post 50 at a position slightly above the handle folding axis defined by the screw 51 so that when the handle 27 is folded, both cables will slack slightly and, because of their positions, will not become entangled with any of the handle parts nor be damaged. The pin 71 and surfaces 67, 69 prevent backward pivotal movement of the handle post 50 which might snap the control cable 88. Furthermore, the relation of these cables in the handle post 50 together with the clips 81, 91 prevents either cable from becoming entangled with the blades 17.

By the foregoing, there has been disclosed an improved folding handle construction for lawn mowers and the like calculated to fulfill the inventive objects hereinabove set forth, and while a preferred embodiment of the present invention has been illustrated and described in detail, various additions, substitutions, modifications and omissions may be made thereto without departing from the spirit of the invention.

We claim:

1. In a mower of the type having a housing supported for movement over the ground, mowing blade means supported by said housing, and an operating handle secured to said housing; that improvement in said mower wherein said handle comprises a lower handle portion including a pair of arms each having one end secured to said housing, the other ends of said arms each being generally channel chaped in cross-section and disposed in spaced confronting relation, an upper handle portion including an elongated post of hollow, generally rectangular cross-section positionable between said channel shaped arm ends, elongated means adapted to both pivotally interconnect said post and said channel shaped arms and draw said channel shaped arm ends toward each other and said post, said other arm ends each being notched to form aligned abutment surfaces, pin means extending through said post and engageable with said abutment surfaces to limit relative pivotal movement between said post and said channel shaped arms and to position said post in longitudinal alignment with said arms.

2. A construction as defined in claim 1 wherein said elongated means extends freely through said post.

3. A construction as defined in claim 1 wherein said elongated means includes a screw having a knob threaded thereon exteriorly of said channel shaped arm ends, said knob being operatively engaged with one of said arm ends and said screw being associated with the other of said arm ends whereby to draw said arm ends together upon threading said knob up on said screw.

4. A construction as defined in claim 3 wherein said screw extends freely through said post and pivotally interconnects the latter with said arm ends, and a bushing fixed to said one arm end and guidably receiving said screw.

5. A construction as defined in claim 4 wherein said screw is fixed to the other of said arm ends.

6. A construction as defined in claim 4 wherein said bushing has an outer flange overlaying a portion of said one arm end and engageable with said knob.

7. A construction as defined in claim 1 wherein said mower includes an electric motor on said housing and adapted to rotate said blade means, said post being adapted to enshroud an electric cable for said motor and having exit opening means therein for said cable above said elongated means.

8. A construction as defined in claim 1 wherein said arms are each pivotally secured at said one end to said housing.

References Cited

UNITED STATES PATENTS

| | | |
|---|---|---|
| 392,282 | 11/1888 | Moyer. |
| 2,458,200 | 1/1949 | Renfroe et al. |
| 2,727,753 | 12/1955 | Johnson _____ 16—110 X |
| 2,851,180 | 9/1958 | McCabe _____ 280—47.37 X |
| 2,926,478 | 3/1960 | Jepson _____ 56—25.4 |
| 3,142,950 | 8/1964 | West _____ 56—25.4 |
| 3,357,716 | 12/1967 | Musichuk _____ 16—110 X |

RUSSELL R. KINSEY, Primary Examiner

P. A. RAZZANO, Assistant Examiner

U.S. Cl. X.R.

16—110; 280—47.37

UNITED STATES PATENT OFFICE
CERTIFICATE OF CORRECTION

Patent No. 3,485,017           Dated December 23, 1969

Inventor(s) R.J. Duran et al

It is certified that error appears in the above-identified patent and that said Letters Patent are hereby corrected as shown below:

Column 1, line 34, "hanle" should read ---handle--;

Column 2, line 41, the phrase "blades adapted "should read ---blades are adapted--;

Column 2, line 69, the number "37" should read ---33--;

Column 3, line 55, the number "68" should read ---69--;

Column 4, line 68, "chaped" should read ---shaped--;

Column 4, line 73, "arms and" should read ---arm ends and--.

SIGNED AND SEALED

SEP 29 1970

(SEAL)
Attest:

Edward M. Fletcher, Jr.
Attesting Officer

WILLIAM E. SCHUYLER, JR.
Commissioner of Patents